Dec. 10, 1929.   F. L. O. WADSWORTH   1,739,338
PNEUMATIC TOOL
Filed July 11, 1921   3 Sheets-Sheet 1
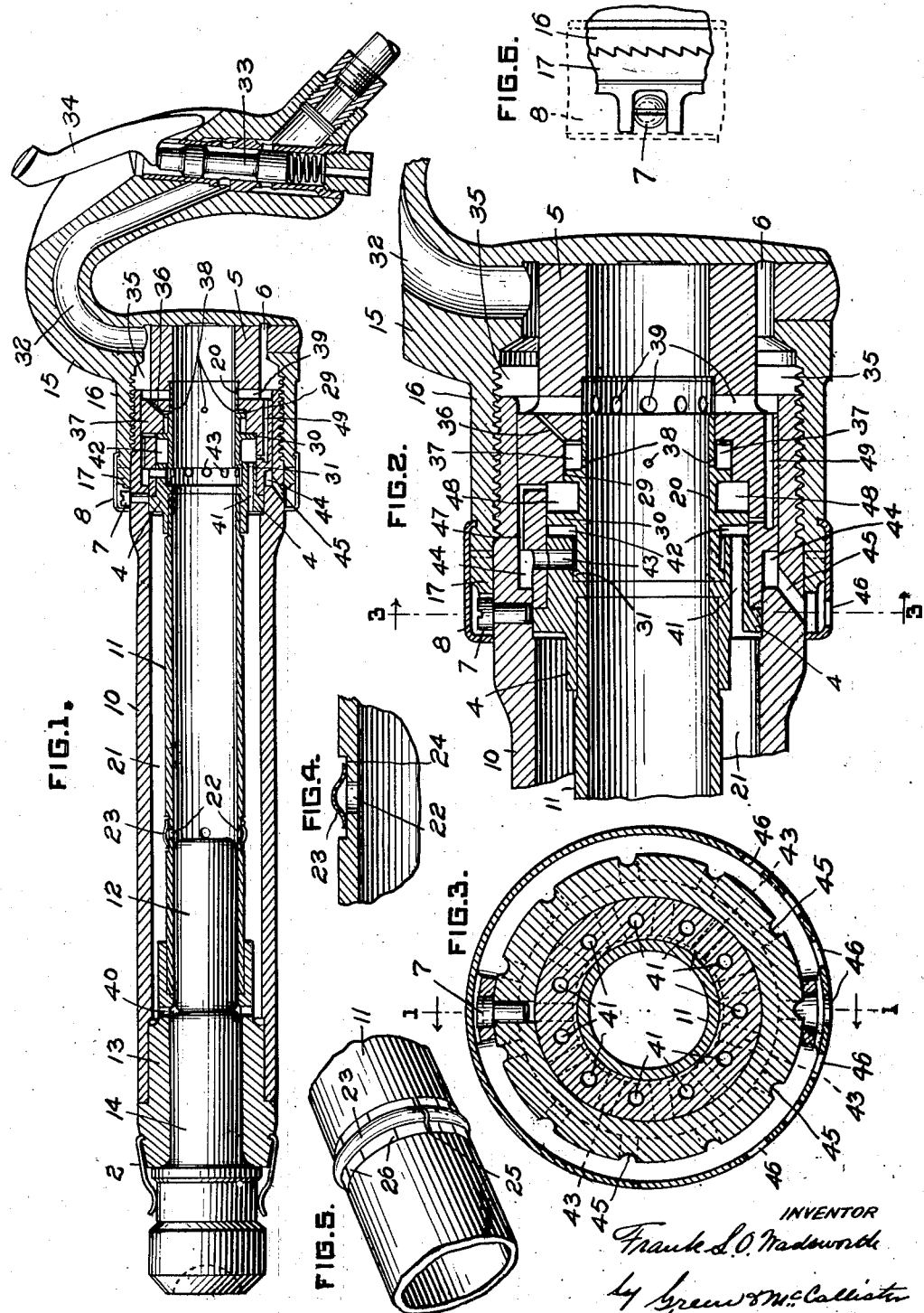
INVENTOR
Frank L. O. Wadsworth
by Green & McCallister
his attorneys.

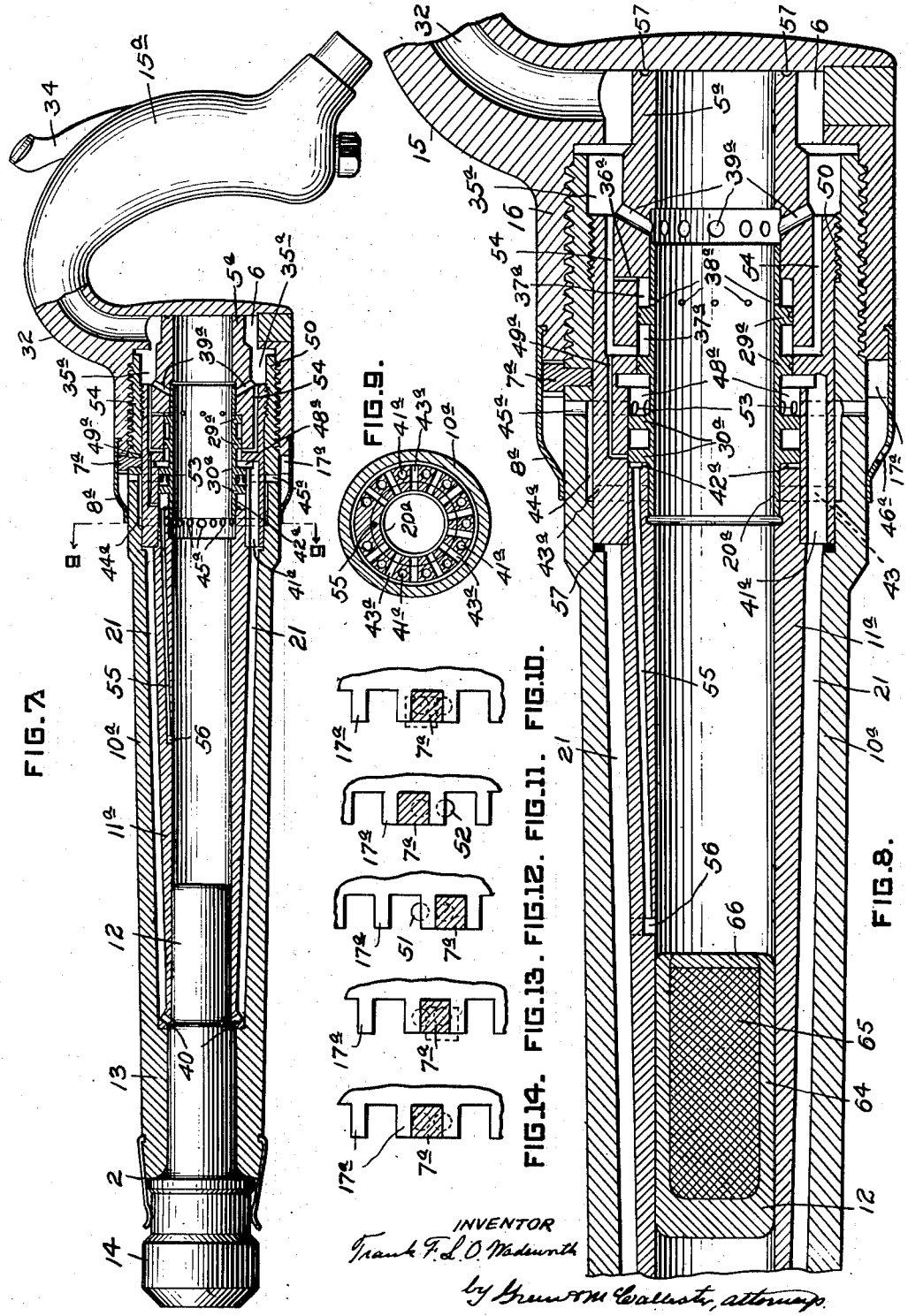

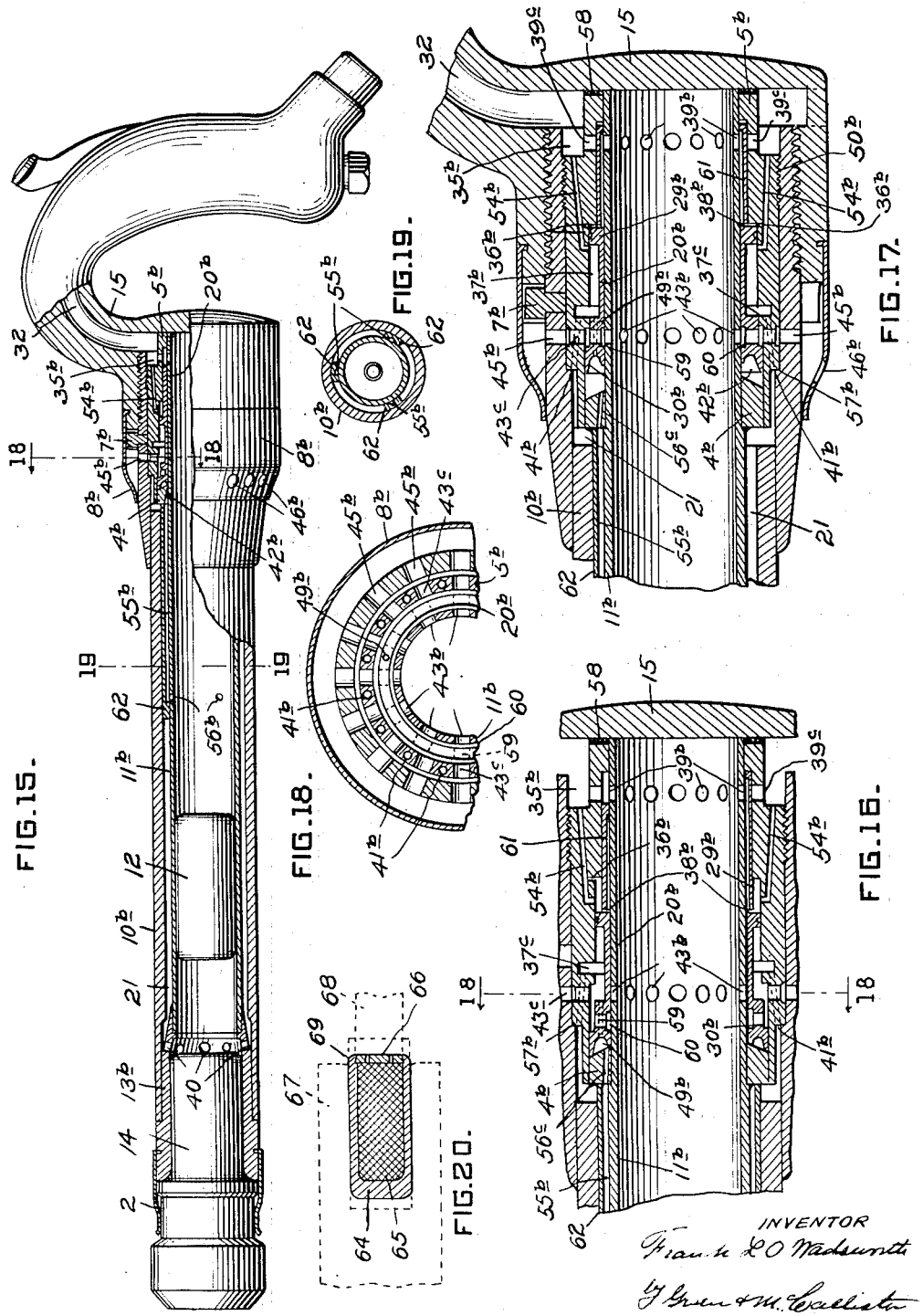

UNITED STATES PATENT OFFICE

FRANK L. O. WADSWORTH, OF PITTSBURGH, PENNSYLVANIA

PNEUMATIC TOOL

Application filed July 11, 1921. Serial No. 483,794.

The present application is a continuation in part of my earlier application Serial Number 369,389, filed March 27th, 1920; Patent Number 1,592,130 and it relates to certain improvements in the mechanical construction of pneumatic hammers, and similar fluid driven percussion tools, that comprise a cylinder, a piston member reciprocable therein, and a distribution valve for controlling the flow of the fluid to and from the piston cylinder.

In the manufacture of tools of this character it has, heretofore, been the practice to make the cylinder barrel from a solid rod or bar of high grade steel; the piston chamber and the longitudinal passageways and parts that serve to connect the distribution valve with the various parts of the said chamber being all formed by drilling and boring operations. This manner of making the cylinder barrel is very costly both because of the large amount of expensive material that is cut away and wasted, and also because of the high cost of the special tools and the skilled labor required for the various machining operations. Another serious objection to this form of construction is that the cylinder walls must be made of considerably greater thickness than is required to attain the necessary strength and rigidity, in order to permit of the drilling of the long longitudinal passageways therein; and even with such added thickness, hammer barrels are frequently spoiled by defective drilling. This further adds to the expense of the manufacturing operations and also adds to the bulk and weight of the finished tool. When these hammers are in constant use the bore of the piston chamber is frequently subjected to rapid and irregular wear; and when this occurs the entire cylinder must be discarded and replaced. The cost of repairing and maintaining a battery of these solid cylinder hammers in good working condition is therefore very high, and the manipulation of the larger sizes of such tools is rendered more difficult and tiresome by the excess weight of parts.

One of the objects of my present improvements is to eliminate or minimize all of the above enumerated difficulties by constructing the cylinder barrel of the hammer from a pair of tubular members—the outer one of which may be made from an ordinary drawn forging, or an ordinary grade of steel pipe, and the inner one of which is separately formed from a relatively thin-walled section of high grade seamless tubing (of phosphor bronze, chrome nickel or nickel vanadium steel, or other suitable metal)—and so spacing and positioning these two members, relatively to each other, as to provide the necessary longitudinal ports and passageways in the said barrel without any drilling or special machining of the cylinder walls.

Another feature of this invention is the mounting of the inner tubular member of my improved hammer, which is the part that receives and guides the reciprocating piston element, in such manner that it may be very readily removed and replaced, when it becomes worn, without requiring the renewal of any other portion of the hammer structure, thus greatly reducing the cost of keeping these tools in first class working condition.

Another object of my present improvements is the provision of a very simple and effective means for locking the handle member to the cylinder barrel of the hammer, in such manner as to permit of the ready disconnection of the aforesaid members when it becomes necessary to remove and replace the inner tubular guide of the reciprocating piston.

A further object of these improvements is to provide a pneumatic hammer construction in which both the bulk and the weight and the tool is reduced to a minimum without any sacrifice of the necessary strength and rigidity of the parts that are subjected to the maximum stresses of service. One of the particular features of this part of my invention is the provision of a special piston member, which is of much greater specific gravity than any heretofore used, and which can therefore be made very short without any decrease in the mass and the striking force, or momentum, of the reciprocating member.

Various other and auxiliary objects of my invention, and other additional features of my improvements—and the advantages inherent therein or attained thereby—will become apparent, to those skilled in this art, from the following detailed description of several illustrative embodiments thereof. These particular exemplifications of my invention are constructions which I have devised and used in the practical application of the aforesaid improvements to pneumatic hammers of the "long stroke" type, but I recognize that such exemplary organizations are only a few of the possible embodiments of the broad features of my invention; and I do not intend, therefore, to limit the application of such features to the particular forms herein disclosed.

Referring now to the illustrative drawings, which constitute a part of my application: Figure 1 is a longitudinal sectional view, on the central plane 1—1 of Fig. 3, through one form of tool that embodies my invention; Fig. 2 is an enlarged view of a portion of Fig. 1, showing the distribution valve member in another position; Fig. 3 is a transverse section on the plane 3—3 of Fig. 2; Fig. 4 is another enlarged detail view of a portion of Fig. 1; Fig. 5 is a perspective view of one of the elements shown in Fig. 1 and in Fig. 4; and Fig. 6 is a plan view of a portion of the locking mechanism for the handle members of this construction.

Fig. 7 is a longitudinal sectional view, similar to Fig. 1, through another form of "long stroke" riveting hammer that also embodies my present improvements; Fig. 8 is an enlarged view of a portion of Fig. 7, with the distribution valve element shifted to its forward stroke position; Fig. 9 is a transverse section on the plane 9—9 of Fig. 7; and Figs. 10, 11, 12, 13 and 14 are partial plan views of the handle locking means which form a part of this second exemplification of my invention.

Fig. 15 is a side view, partly in elevation and partly in longitudinal section, of a third embodiment of the present improvements; Fig. 16 and 17 are enlarged views of a portion of Fig. 15; and respectively show the distribution valve element of the combination in its forward stroke and its return stroke position; Fig. 18 is a partial transverse section on the plane 18—18 of Figs. 15 and 16; and Fig. 19 is a cross-sectional view on the plane 19—19 of Fig. 15. Fig 20 is a central sectional view of the improved piston element of my new combination.

The hammer illustrated on the first sheet of drawings (Figs. 1 to 6, inclusive) is substantially identical with that shown in Figs. 1 to 5 of my earlier application (Serial No. 369,389 supra); and in this construction the body of the tool is composed of outer and inner tubular members 10 and 11, within the inner one of which the piston 12 reciprocates. At the forward end of the tool is a rivet-set bearing sleeve or holder 13, which is rigidly secured to the outer tube 10 and supports one end of the inner tube 11; and which is adapted to receive the shank of a suitable rivet set 14 that is detachably held in place by the spring clip 2.

At the opposite end of the tool is a handle 15 which has a tubular head or sleeve 16 that is screwed over the rear end of the outer tube 10 and is locked in place thereon by a ratchet ring 17, that engages with the ratchet teeth on the end of the sleeve 16, and is held from turning by the eccentric head of an adjustable (rotatable) dog or pin 7. Any suitable form of retainer, such as an annular spring clip 8 may be utilized to secure the parts 17 and 7 in place; and in the particular construction under consideration this clip 8 also serves as a guard ring or deflector for controlling and directing the escape of the exhaust from the piston chamber.

The rear end of the outer tubular member 10 is bored out to receive a two-part valve box which consists of a front section 4 that engages the rear end of the inner tube 11, and a complementary section 5 that supports the section 4 and projects rearwardly into a recess 6 in the handle head. These complementary sections 4—5 are bored and finished to receive a reciprocatory valve member 20 of tubular or annular form, which is provided with three projecting ribs or flanges 29, 30 and 31, and which is adapted to control the openings of certain inlet and exhaust ports, and thereby govern the admission and escape of motive fluid, in a manner which will be presently explained. In the present instance the rear end of the inner tube 11 is supported by the front end of the valve box section 4 and terminates in front of the valve member 20, but said tube may, if desired, be continued through the valve and valve-box sections to the rear end of the piston chamber.

The annular space 21 between the outer and inner tubes 10—11 constitutes a longitudinal conduit which extends from the port openings 40—40 at the front end of the piston chamber to the set of ports 41—41 that lead to the recess 42 in front of the valve flange 30. An intermediate portion of the conduit 21 is in communication with the piston chamber through an annular row of openings 22 which are covered by the spring check valve 23 that is seated in the shallow groove 24 on the external periphery of the tube 11 (see Figs. 1, 4 and 5).

The handle 15 is provided with a supply passage 32 which is controlled by a valve 33 operated by a thumb lever 34 in the usual manner. The inner end of this passage opens into the recess 6 and the annular chamber 35 which surrounds the rear end of the valve box section 5. This chamber is in constant communication, through one or more small ports 36, with the annular chamber 37 in which the flange 29 of the valve member 20 reciprocates. The valve member 20 is provided with a suitable number of small ports 38 which are located just back of the valve flange 29, and which serve the purpose of venting the chamber 37 and prevent the trapping of air therein when the valve member shifts rearwardly.

Another series of larger ports 39—39 extend through the valve box section 5 and serve to deliver live motive fluid into the interior of the piston chamber when the main control valve 20 is in its forward position, as shown in Fig. 2; these ports being cut off by the valve when it is in its rearmost position, shown in Fig. 1. When the valve 20 is in the first-mentioned position the chamber 42 in front of its forward flange 30 is in communication with a series of radial ports 43 leading through the valve box and communicating at their outer ends with an annular chamber 44 formed between the valve box and the outer cylinder. This chamber 44 is in constant communication with the atmosphere through a suitable number of ports 45 which open into a space covered by the spring clip 8, the latter having ports 46 therethrough to permit the escape of the fluid. When the valve member 20 is in its rear position shown in Fig. 1, the chamber 42 is cut off from the exhaust ports 43 by the flange 31 on the valve, and a direct communication is established between said ports 43 and the piston chamber so as to permit the exhaust of the expended charge of motive fluid from the rear end of the piston chamber upon the return stroke of the piston.

In order to prevent any trapping of air in the chamber in front of the valve flange 30, I provide a small vent 47, which communicates at one end with the exhaust chamber 44 and at its other end with the chamber 48 between the valve flanges 29 and 30. Another restricted passageway 49 leads from the main supply chamber 35 and terminates upon the inner wall of the valve box in such position that it will be closed by the valve flange 30 when the valve member is in its forward position, shown in Fig. 2, but will be put into communication with the chamber 42 as soon as the said valve member starts to move rearwardly.

The operation is as follows: When the thumb lever 34 in the handle 15 is pressed down the live motive fluid will be admitted to the main supply chamber 35 and will act on the rear face of the flange 29, to move the valve forwardly into the position shown in Fig. 2. A charge of motive fluid is thus admitted through the inlet ports 39 into the piston chamber, and the piston is driven forwardly thereby. The previous dead air which is in front of the piston, and in the conduit 21, escapes to the atmosphere through the ports and passageways 40, 21, 41, 42, 43, 44, 45 and 46. As soon as the piston passes the ports 22 in the inner tube 11, a portion of the live charge of motive fluid escapes therethrough past the check valve 23 and into the conduit 21 until the pressure in the said conduit is substantially equal to that in the piston chamber. This escaping air passes through the ports 41 into the chamber 42 and exerts a combined static and kinetic pressure against the large flange 30 of the valve member 20, which overbalances the pressure in the chamber 37 upon the rear flange 29, and the valve member 20 will then be shifted to its rear position, as shown in Fig. 1. This backward movement uncovers the end of the port 49 and permits live motive fluid to flow from the main supply chamber 35 through said port 49 into the chamber 42 and thus assists in shifting the valve, and in maintaining it in its rearward position. The inlet ports 39 will now be cut off from the piston chamber and the exhaust ports 43 will be open to the atmosphere. The live motive fluid which has passed into the conduit 21 will be prevented from returning to the main piston chamber by the action of the check valve 23; and will pass through the ports 40 and exert a pressure upon the forward end of the piston to effect the return stroke of the latter. The motive fluid that is admitted to the chamber 42, through the passageway 49, will, of course, pass into the chamber 21 (through the passageways 41) and will tend to aid and accelerate the rearward stroke of the piston; but the sizes of the passageways 49 and 41 are so proportioned that this effect will be relatively insignificant.

The relative volumes of the chamber 21 and the piston cylinder are preferably so proportioned that at the rear end of the piston stroke the pressure in the said connected chambers is not much above atmospheric. This drop in pressure reduces the force acting on the front valve flange 30 to such a point that it is no longer able to overcome the live air pressure on the rear of the smaller valve flange 29; and the valve 20 will be again shifted forwardly. If this reduction of pressure on the larger valve flange is not, in itself, sufficient to complete the desired movement of the valve, the said action will be supplemented by the closure of the small vent ports 38—by the rearwardly moving piston—and the consequent rapid building up of the pressure in the restricted chamber space 37 to a point where it will be sufficient to force the said member to its forward position, shown in Fig. 2. The continued rearward movement of the piston under its own momentum is stopped and reversed by a cushion of fluid pocketed in the rear end of the piston chamber, and the above described cycle of operations is continued as long as the admission valve 33 is kept open.

The hammer shown in Figs. 7 to 14 inclusive is of the same general character as that just described, but differs therefrom in certain details of construction and operation. In this second embodiment of my invention the inner tubular member 11ª forms an integral extension of the forward valve box section; and the rivet set bearing sleeve 13 is also an integral part of the outer tubular member 10ª. The front end of the member 11ª terminates in a flange, that engages with the shoulder at the rear end of the rivet-set sleeve 13 and is provided with a row of radial ports 40—40; and the rear end of this member is formed with a ground collar and shoulder joint that is non-rotatably supported in the front extremity of the rear valve box section 5ª. The latter member is, in this construction, provided with a threaded portion 50 that is screwed into the rear end of the outer tube 10ª until the inner tube 11ª is clamped tightly in position between the rear end of the sleeve portion 13 and the front end of the section 5ª; and the assembled parts of the hammer barrel are locked in position by screwing on the handle member 15, until the bottom of the recess 6 engages the rear end of the said valve box section 5ª. The outer end of the handle sleeve 16 is, in this case, provided with a series of rectangular ratchet teeth 17ª, of the form and arrangement shown in the detail views of Figs. 10 to 14, inclusive; and the barrel of the hammer is provided with two holes 51—52 whose distance apart is equal to one-half of the complete interval between successive ratchet teeth. The handle 15ª, and the barrel 10ª are locked together by means of the eccentric headed pin 7ª which can be set in any one of three different positions in either of the holes 51 or 52 (as shown in Figs. 10, 11 and 14 and Figs. 12 and 13, respectively) so as to permit of an adjustment of one-sixth of the tooth interval, or in this case about three degrees, between the two locked members. The ratchet teeth 17ª and locking pin 7ª are covered by the spring clip 8ª, which also serves as an exhaust deflector.

The valve box section 5ª is bored and ground to receive and guide the distribution valve 20ª, which is provided with two flanges 29ª and two flanges 30ª, and with a series of vents 38ª that are located just back of the rear flange 29ª. A circumferential series of radial exhaust ports 43ª are drilled through the overlapping portions of the interengaged members 5ª and 11ª; and the outer ends of these ports are in communication, through the annular passageway 44ª, with another set of radial ports 45ª that open into the space covered by the front end of the spring clip 8ª. The valve box section 5ª is also provided with a second set of radial ports 53 that lead from the annular chamber 44ª to the chamber 48ª between the valve flanges 29ª—30ª, and with a series of longitudinal passageways 41ª that lead from the rear end of the conduit 21 (between the outer and inner tubes 10ª—11ª) to the rear enlarged portion of this same chamber 48ª. A third set of radial ports 39ª lead from the rear end of the piston chamber to the annular reservoir 35ª surrounding the reduced extremity of the valve box 5ª; and two passageways 54, 54 extend from this reservoir to the forward portion of the chamber 37ª in which the valve flanges 29ª reciprocate. A small duct 36ª leads from the side of one of the conduits 54 to the space back of the rear flange 29ª of the valve 20ª; and another restricted duct 49ª extends from the front end of this same conduit to the chamber 42ª in which the front flange 30ª is positioned. Another passageway 55 leads from the chamber 42ª to a port 56 that opens into the central part of the piston chamber.

The operation of the last described organization is slightly different from that of the construction shown in Figs. 1 to 6, inclusive. When the live motive fluid is admitted to the reservoir 35ª, by pressing the valve trigger 34, it flows into the chamber 37ª, through the passageways 54 and 36ª, and forces the distribution valve 20ª forward to the position shown in Fig. 8. This opens the ports 39ª and allows the motive fluid to enter the rear end of the piston chamber and drive the piston 12 forwardly. In this position of the parts the passages 41ª are in communication with the exhaust openings 45ª—46ª, through the chamber 48ª, the radial ports 53 and the annular space 44ª; and the dead air in advance of the piston is thus allowed to escape through the ports 40, the conduit 21 and the communications last mentioned. When the piston, in its advance movement, passes the opening 56 the live air back of the piston flows into the chamber 42ª, in front of the valve flange 30ª, and forces the distribution valve rearwardly to the position shown in Fig. 7. This action simultaneously closes the ports 39ª, and opens the ring of exhaust ports 43ª, and also puts the passageways 54 into communication with the passages 41ª through the chamber 48ª, thus allowing the air back of the piston to escape, and concurrently admitting a limited amount of live motive fluid to the front end of the piston chamber. The position of the port 56 and the area of the passage 55 are preferably so adjusted as to produce the desired valve movement just before the piston completes its forward or impact stroke; and under these circumstances the live air entering and accumulating in the conduit 21 will be effective in immediately initiating and then assisting in the return movement of the piston to the rear of the piston chamber. During this movement the valve 20ª is held in its rearward position by the constant flow of a small amount of high pressure air, through the passageway $49^a$, into the space $42^a$ in front of the valve flange $30^a$; and the pressure of live air on the rear flange $29^a$ is relieved by the constant escape of the motive fluid from the chamber $37^a$ through the vents $38^a$ to the open exhaust. But as soon as the piston has reached and covered the ports $43^a$ (on its return stroke) the further escape of air from the back of the piston chamber is cut off; and the continued flow of live air through the duct $36^a$ rapidly builds up the pressure on the rear face of the valve flange $29^a$ until it is sufficient to overcome the force acting on the front face of the front flange $30^a$, and the valve $20^a$ will then be thrown forwardly to the position shown in Fig. 8. The rearwardly moving piston is brought to rest, and then thrown forward again by the "cushioning" of the air that has been trapped in the rear of the piston chamber, thus allowing a fresh charge of live motive fluid to pass through the opened ports $39^a$, and the above described cycle of movements is repeated.

Figs. 15 to 19 inclusive illustrate a third exemplification of my improvements, in which the inner tubular member $11^b$ is formed of a straight piece of cold drawn tubing that extends the entire length of the hammer barrel and is rigidly clamped therein by the engagement of its opposite ends with the rivet set sleeve $13^b$ and the recessed end of the handle 15. The rear portion of this tube is finished on its external periphery to receive the front member $4^b$ of the valve box, and to also form a bearing for the inner surface of the annular distribution valve $20^b$. The rear member $5^b$ of the valve box is provided with a threaded portion $50^b$ that is screwed into the outer barrel $10^b$ until the front end of the said member is engaged with the shoulder $57^b$ of said barrel; and the parts are locked in their engaged positions by a compressible or elastic washer 58 that is interposed between the rear end of the member $5^b$ and adjacent face of the handle recess. The handle itself is locked in place on the hammer barrel in the manner shown in detail in Figs. 10 to 14, inclusive.

The inner surface of the rear valve box section is recessed and ground to receive and guide the reciprocating valve $20^b$, which is provided with two flanges $30^b$ and two flanges $29^b$, and with an annular row of ports 59 that are joined by a shallow groove 60 on the inner face of the valve shell. This reciprocating member is also provided with a series of radial ducts $38^b$ that lead from a point just back of the rear flange $29^b$ to a shallow annular groove 61 that extends to a point near the rear end of the valve shell. The inner tubular member $11^b$ is pierced by two rows of port openings $39^b$ and $43^b$; and the valve box $5^b$ is provided with a corresponding series of radial passageways $39^c$ and $43^c$ that communicate respectively with the annular chamber $35^b$, that opens from the live air supply passage 32, and with the discharge ports $45^b$ that open into the space beneath the spring clip $8^b$. Two diametrically opposite passages $54^b$—$54^b$ lead from the live air reservoir $35^b$ to the median part of the chamber $37^b$ in which the end elements of the flange $29^b$ reciprocate; and a restricted duct $36^b$ leads from one of these passageways to the extreme rear end of the said chamber. A series of longitudinal passages $41^b$ lead from the front enlarged portion $37^c$ of this same chamber to a point adjacent the shoulder $57^b$ of the valve box $5^b$, and open at that point into the rear end of the annular space 21 between the outer and inner tubes $10^b$—$11^b$. The front valve flange $30^b$ is pierced with a small duct $49^b$ which affords a direct communication between the chamber $37^b$ and the chamber $42^b$ in which the front flange reciprocates. The space in front of this flange is also in communication with the central part of the piston chamber through the ports $56^b$ and $56^c$ and the passageways $55^b$ that are most conveniently formed of bracing or welding three grooved strips 62, 62, 62 on the exterior of the inner tube $11^b$.

The operation of this third embodiment of my invention is similar to that of the construction shown in Figs. 7 to 14 inclusive. When the valve is in the forward stroke position shown in Figs. 15 and 16 the live motive fluid passes directly from the reservoir $35^b$, through the communicating ports $39^c$—$39^b$ into the rear end of the piston chamber, and drives the piston member forward. The air in the front end of the piston chamber is expelled through the ports 40 into the conduit 21; flows through the row of passages $41^b$ into the chamber $37^c$—$37^b$; and escapes therefrom through the open ports $43^c$—$45^b$ and $46^b$. When the rear end of the advancing piston passes the openings $56^b$ the live motive fluid passes, through the ducts $55^b$ and ports $56^c$, into the space $42^b$ in front of the valve flange $30^b$, and overbalances the effect of the pressure on the rear face of the rear flange $29^b$; and the valve is thus moved rearwardly into the position shown in Fig. 17. In this position the live air ports $39^b$ are closed, and the ports 59 of the reciprocating valve member are brought into registry with the ports $43^b$ and $43^c$, thus opening a direct communication between the rear end of the piston chamber and the external air. The rearward movement of the valve $20^b$ also closes the communication between the ports $43^c$ and the chamber $37^c$—$37^b$, and opens the communication between the said chamber and the passages $54^b$, thus permitting a restricted amount of live motive fluid to flow, through the conduit connections $41^b$—21—40, to the front end of the piston chamber. The position and size of the control ports and passages 56^b—55^b—56^c—and the relative area of the valve flanges 30^b, 29^b—are preferably so determined that the rearward movement of the distribution valve is completed just before the piston strikes the rivet set 14; and the trapped and partially compressed air in the front end of the conduit 21 mixes with the live air flowing into the rear end of the said conduit to effect the immediate initiation of the return stroke of the piston. During this return movement the valve 20^b is held in its rearward position by the effect of the live air flowing from the chamber 37^b, through the duct 49^b, into the chamber 42^b, and exerting a limited pressure on the front face of the flange 30^b;—the pressure on the rear face of the opposite flange 29^b being relieved by the venting action of the ports 38^b and the passage 61 which permits the air behind the rear flange to escape to the piston chamber and thence to the open exhaust ports 43^b etc. But when the piston, in its return stroke, reaches and covers these open exhaust ports the "venting" of the space behind the valve flange 29^b is checked; and the live air constantly flowing into this space through the duct 36^b rapidly builds up the pressure on the said flange until it is sufficient to again throw the valve to its forward position (Figs. 15 and 16). The return movement of the piston has, in the meantime, been arrested and reversed by the compression of the air trapped in the rear end of the piston chamber (by the covering of the ports 43^b); and the live air rushing through the opened ports 39^b rapidly accelerates and completes the next forward stroke.

The force of each blow delivered by a pneumatic hammer depends upon the mass of the reciprocating piston member and the velocity with which this member is moving at the time of its impact on the head of the rivet set or chisel. The impact velocity can be increased either by augmenting the air pressure under which the hammer is operating, or by increasing the length of the stroke. The maximum pressure available is determined by practical considerations, and cannot, under the usual conditions of operation, be much greater than one hundred pounds per square inch. An increase in the length of the stroke necessarily involves a corresponding increase in the length, weight and bulk of the tool; and for this reason hand-operated hammers are usually limited to a stroke of not more than twelve inches. In my improvised construction I have materially reduced the weight, and, in some cases, the diameter of the hammer barrel, by making it of two relatively thin tubes, instead of in one thick heavy cylinder; and I have also considerably decreased the overall length of the hammer for a given length of stroke by providing the annular recesses, 35—35^a—35^b, in the hammer handle for the reception of the rear end of the valve box. I have effected in this way a reduction of from 20% to 30% in weight; and a reduction from 16½ inches (the average length of a No. 10 (ten inch stroke) hammer barrel and handle socket of the usual construction) to 15½ inches or less, in length.

The force of each blow of the hammer can also be augmented by increasing the mass of the reciprocating piston. But in the usual construction, this involves an increase in the length of this member—since the available diameter of the piston is fixed by commercial practice—and a corresponding increase in the length of the cylinder barrel for a given stroke. In order to avoid this difficulty and obtain a heavier piston without any increase either of length or diameter—or conversely, shorten the piston and the hammer barrel without decreasing the force of each blow—I may employ the improved form of reciprocable member that is shown at the left hand end of Figure 8 and separately in Figure 20. In this form the piston 12 is composed of an outer shell 64,—which is preferably made from tungsten steel, or tungsten vanadium steel, and which is properly heat treated to resist the shocks to which its forward end is subjected—and a core 65 which consists, either of substantially pure tungsten powder that has been sintered or fritted together into a dense coherent mass, or of a ferro-tungsten or a nickel tungsten alloy (that can be melted in an electric furnace) or of a relatively fusible mixture of tungsten, mercury, cadmium and bismuth. In making up this composite piston member I first prepare a hollow shell which is somewhat longer than the finished length of the piston (as indicated in dotted lines in Fig. 20); and raise this shell to as high a temperature as the metal will withstand without injury. I then fill the shell either with white hot tungsten powder, or with the fused tungsten alloy, insert the cover piece 66 in the open end of the shell, and subject the assembled parts to great pressure between the female and male dies, 67—68, of a powerful press. The edge of the plate 66 is beveled, and the plate is cold when it is placed in the open end of the shell 64. The outer periphery of the shell is originally provided with a raised rib 69, at a point corresponding to the rear end of the finished piston; and when the core and cover parts 65—66 are subjected to the pressure of the male die 68, the outer member 64 is forced down into the female die 67 and the hot rib of metal 69 is compressed against the beveled edge of the cold plate 66. This press die action—in combination with the subsequent contraction of the hot shell on the core and cover plate—locks and unites the assembled parts into a substantially integral whole that may be subjected to any necessary or desired thermal or mechanical treatment without affecting the solidity and shock resisting characteristics of the composite article.

The specific gravity of pure tungsten metal is nearly two and one-half times that of ordinary steel; and the density of the tungsten alloys above mentioned is nearly as great as that of pure tungsten. A piston which is made up in the manner above described has, therefore, a mean specific gravity which is about 60% greater than that of the ordinary pneumatic hammer piston. A tool which has a given length of stroke—say ten inches—will therefore have a greatly increased striking force when it is provided with one of my improved piston members; and, conversely, one of these composite steel-tungsten pistons which has the same mass and the same striking force as the ordinary piston is only about 60% as long as the latter. An ordinary 4-inch piston may therefore be replaced by a two and one-half inch piston of my construction, without reducing the maximum capacity or driving power of the hammer; and the length of the cylinder barrel—which is equal to the stroke plus the length of the piston—can be correspondingly reduced. But I prefer to avail myself of both advantages—viz, the decrease in the length and weight of the hammer, and the increase in its capacity—by using a piston which has at the same time a decreased length and a somewhat greater mass than the standard solid steel piston; and by utilizing this, in conjunction with other features of my invention I am enabled to produce, for example, a No. 10 hammer (10 inch stroke) which is not much longer or heavier than the ordinary No. 8 hammer (8 inch stroke) and which has a driving power nearly equal to the very much larger and heavier No. 12 hammer (12 inch stroke) now in use.

The marked advantages that result from the utilization of my improvements—i. e., the diminution in the first cost construction, the reduction in the weight and bulk of the hammer, the increase in its driving force, and the decrease in the loss of time and the expense in making repairs, etc.—will now be clearly apparent to those skilled in this art; and with the foregoing disclosure as a guide the designers of fluid actuated percussion tools will be able to apply the various features of this invention (in whole or in part as may be desired) to many different types and forms of such tools. The various exemplary constructions which have been heretofore described are to be regarded as illustrative only, and not as limiting the scope of my invention.

What I claim is:

1. In combination in a pneumatic tool, a tubular casing, a tubular member enclosed within but spaced from the inner peripheral face of said casing, and an annular valve box within said casing, forming a support for one end of the tubular member and into which said member projects.

2. In combination in a pneumatic tool, a tubular casing provided at one end with an aperture for the reception of a tool, a handle secured to the other end thereof, an inner tubular member located within said casing, and a valve box inserted into the handle end of said casing and surrounding and supporting the adjacent end of the inner tubular member.

3. In combination in a pneumatic tool, an outer tubular member bored to provide a valve box chamber at the rear end thereof, an inner tubular member concentric therewith but spaced from the inner peripheral face thereof and supported at the front end by a shoulder carried by the outer tubular member, a valve box located in the valve box chamber of the outer member and surrounding and supporting the adjacent end of the tubular member, and a handle secured to the outer tubular member and adapted to lock the inner tubular member and the valve box in assembled position.

4. In combination in a pneumatic hammer, an outer tubular member bored at one end to provide a valve box chamber, an inner tubular member located within but spaced from the inner peripheral face of the outer member and supported at one end by a shoulder carried by the outer member, a valve box located in the valve box chamber of the outer member and surrounding and supporting the adjacent end of the inner member, and a handle secured to the outer member and adapted to lock the inner member and the valve box in assembled positions, said inner member extending from said shoulder through the valve box.

5. In combination in a pneumatic hammer, a hammer barrel comprising inner and outer tubular members of different material, the inner member being spaced from the inner peripheral face of the outer member, a valve box projecting into one end of the outer member and forming a support for and surrounding one end of the inner member, and a handle secured to the outer member and locking the inner member and the valve box in assembled positions.

6. In combination in a pneumatic hammer, a hammer barrel comprising an outer tubular member and a replaceable inner tubular member of wear-resisting material, said inner member being concentric with, but spaced from, the inner peripheral face of the outer member, a valve box extending into one end of the outer member and forming a support for and surrounding one end of the inner member, and a handle secured to the outer member and locking the inner member and the valve box in assembled positions.

7. In combination in a pneumatic hammer, a hammer barrel comprising an outer tubular member and a seamless drawn tube located therein, a free piston operating within said tube, a valve box projecting into one end of the outer member, surrounding and forming a support for the adjacent end of the tube and provided with fluid delivery passages for controlling the delivery of fluid to and from the barrel, and a handle secured to the outer member and locking the inner member in assembled position.

8. In combination in a pneumatic tool, an outer tube, an inner tube spaced therefrom to provide a segregating chamber, a free piston operating within the inner tube and a reciprocating valve mounted to reciprocate on the exterior of said inner tube and controlling the delivery of motive fluid to the interior of said tool.

9. In combination in a pneumatic hammer, a hammer barrel bored to receive a valve box, and an inner tubular member, a separately formed inner member concentrically located within said barrel but spaced from the inner peripheral face thereof except at the bit end thereof, an annular valve box located within said barrel but projecting beyond the end thereof and surrounding and supporting one end of said tubular member and forming an extension of the hollow interior thereof, a handle member closing the projecting end of said valve box and secured to said barrel, a rivet-set holder projecting into said barrel and around the end of said tubular member, and a free piston reciprocable within the way formed by said tubular member and said valve box.

In testimony whereof, I have hereunto subscribed my name this 8th day of July, 1921.

FRANK L. O. WADSWORTH.